United States Patent [19]

Specht

[11] 4,152,060
[45] May 1, 1979

[54] EPICYCLIC ELECTROMECHANICALLY ACTUATED LENS DRIVE

[75] Inventor: Manfred G. Specht, Newton, Mass.

[73] Assignee: Polaroid Corporation, Cambridge, Mass.

[21] Appl. No.: 823,395

[22] Filed: Aug. 10, 1977

[51] Int. Cl.² .............................. G03B 3/10; G02B 7/02
[52] U.S. Cl. .................................... 354/195; 354/197; 350/255
[58] Field of Search ............... 354/23 D, 25, 163, 195, 354/197; 352/139, 140, 142; 353/76; 350/187, 247, 255; 310/82

[56] References Cited

U.S. PATENT DOCUMENTS

| | | | |
|---|---|---|---|
| 3,701,309 | 10/1972 | Thiele et al. | 355/56 X |
| 3,730,068 | 5/1973 | Freeland | 354/195 |
| 3,770,997 | 11/1973 | Presley | 310/82 |
| 3,927,414 | 12/1975 | Moriyama et al. | 354/195 |
| 3,970,370 | 7/1976 | Kawai | 354/195 X |
| 3,972,056 | 7/1976 | Tsujimoto et al. | 354/195 X |
| 3,988,747 | 10/1976 | Lermann et al. | 354/25 |
| 4,002,405 | 1/1977 | Stahl | 354/195 X |
| 4,010,479 | 3/1977 | Nobusawa | 354/25 |
| 4,017,872 | 4/1977 | Iwata et al. | 354/234 X |
| 4,031,383 | 6/1977 | Hosoe et al. | 352/140 X |

*Primary Examiner*—Stephen J. Tomsky
*Assistant Examiner*—William B. Perkey
*Attorney, Agent, or Firm*—Edward S. Roman

[57] ABSTRACT

An apparatus for precisely moving a camera lens element to focus an image at the camera's film plane is disclosed. The apparatus employs an electrically controlled and incremently stepped rotating motor which moves a lens element parallel to the lens axis. The disclosed motor is an epicyclic motor, and a mechanical coupling arrangement interconnects a driven rotating motor element and the lens element holder and converts the rotary motion of the motor to incremental translation of the lens element. The apparatus moves the lens element in this manner in small precisely controlled increments, for example, steps of less than 0.001 inch.

14 Claims, 5 Drawing Figures

EPICYCLIC ELECTROMECHANICALLY ACTUATED LENS DRIVE

BACKGROUND OF THE INVENTION

This invention relates generally to camera focusing equipment and in particular to a camera having automated apparatus for moving a camera lens element to focus an image at the film plane.

Automatic lens focusing systems have been discussed and disclosed in the literature for several years. These systems generally have a continuously movable rotating motor, controlled by an electrical signal, with the motor mechanically coupled to move a lens element parallel to its axis to focus an image at the film plane of the camera. In prior art systems, a continuous feedback interaction is provided to generate for the camera electronic circuitry an electrical signal representing either the present position of the lens in its path of movement or the quality of the present focus of the image at the film plane. In this manner, further movement of the lens, including the direction of movement, is controlled by the electrical circuitry.

Even though often discussed in the literature, automatic focusing systems have not been entirely successful in still or movie cameras. Part of the reason may be that the feedback interaction undesirably introduces an added degree of complexity in the camera system. In addition, even though the electronics packages used in current camera equipment generally take advantage of recent technological innovations to reduce their physical size, similar technological advances have not been adapted to reduce the size of motor drives for automatic focusing mechanisms. The motor drives noted in the art have used a continuously movable motor, typically an analog-driven D.C. motor, which is mechanically coupled as by a worm drive to move the lens element to the focus position. The mechanical and electrical constraints heretofore placed on this kind of motor operation have retarded its miniaturization.

Needless to say, stepping motors—which are typically larger in size and weight than continuously movable analog motors and which are well known in non-camera applications where their size and bulk (for meeting required torque requirements) are acceptable—have not generally been used for focusing in photographic cameras. This is so even though they could be driven by digital circuitry. Stepping motors have apparently not generally been used because the increment of rotational movement is often large, and cumbersome gearing is required to reduce the step size for precision focusing. Further, stepping motors themselves generally are relatively large and thus not considered suitable for camera systems.

It is therefore an object of this invention to provide an automatically focusing camera system in which the focusing process can be carried out using incremental motion, while maintaining precision movement of the lens element.

Other objects of the invention are to provide an automatic lens focusing apparatus which meets the torque requirement of the mechanical lens system, which is simple to maintain and to operate, which is reliable, and which results in a moderate camera size.

Yet other objects of the invention include providing a system which does not require continuous feedback interaction from the apparatus during the focusing operation, and which can be driven by ditigal circuits.

It is also an object that the automatic focusing equipment provide precise lens movement and that it require minimal mechanical gearing and linkages.

SUMMARY OF THE INVENTION

To attain these and other objectives noted below, the invention features motorized apparatus for moving a camera lens element to focus an image at the film plane or other image plane of the camera. The apparatus has an incrementally driven rotating device which rotates by a minimum known angular increment (or other known angular unit) in response to an electrical drive signal. A mechanical coupling applies the rotation of the driven device to move a lens holder, and a support element positionally fixed relative to the film plane supports the lens holder for movement in at least a direction parallel to the optical axis of the lens element. By means of the coupling and of the support element, the incremental rotary motion of the driven device is converted into incremental focusing movement of the lens holder along the optical axis.

In a particular embodiment of the invention, the incrementally driven device is an epicyclic motor. The epicyclic motor has a stationary stator that encloses an eccentric rotating armature which has the general shape of a thick-walled hollow cylinder. A positionally fixed armature support is centrally mounted coaxially within the motor stator. The lens holder is mounted coaxially within the motor stator by means of a fixed holder support which the holder threadably engages so as to translate axially upon being rotated. The armature is geared both to the armature support and to the lens holder.

Drive signals, applied to the stator, drive the armature to roll around the armature support. This motion simultaneously rotates the armature and the lens support about the motor stator axis, with the center of the rotating eccentrically mounted armature describing a circle and with the center of the rotating lens holder moving along the optical axis, which coincides with the stator axis.

The apparatus can also include means for providing a pulse output signal representative of the number of increments to rotate the device, means for determining the direction to move the lens element, and means responsive to the pulse output signal and the direction determining means for providing the drive signals to the device.

The apparatus further features, in a particular preferred embodiment, means for resetting the device to an initial starting position corresponding to a selected axial position of the focusing lens element. A focus determining circuit, which determines the distance to the image for example with sonic ranging techniques, produces electrical drive signals that operate the driven device, e.g. the epicyclic motor, to rotate in a direction and by an amount to position the lens element relative to this reset position.

With these features, the automatic focusing mechanism of the invention can be structured coaxially about the lens system and hence packaged compactly in a relatively small space. The mechanism moves the lens focusing element in precise incremental steps to provide accurate focusing without continuously interactive feedback. Further, the mechanism operates reliably.

DESCRIPTION OF THE DRAWINGS

Other features, advantages, and objects of the invention will appear from the following description of a preferred embodiment of the invention taken together with the drawings, in which.

DESCRIPTION OF A PREFERRED EMBODIMENT

Figure 1:
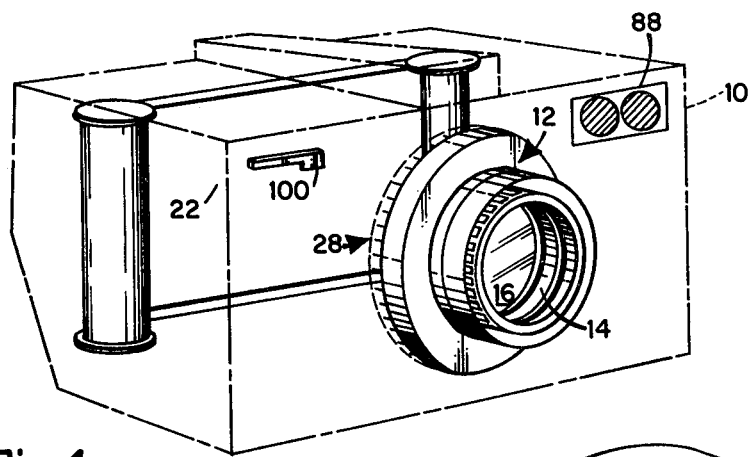
FIG. 1 is a perspective view of a camera having an automatic focus drive apparatus according to the invention.

Referring to FIG. 1, a camera 10 includes a lens mount 12 in which a lens holder 14 is positioned for rotating motion. Lens holder 14, which mounts a focusing lens element 16, is supported to move also in a direction parallel to the axis of the lens to focus an image at a camera film plane 22.

Lens element 16 and lens holder 14 are supported and encompassed by, and are coaxial with, an incrementally driven rotating device 28. In the preferred embodiment illustrated, this device is an epicyclic motor secured within and to camera 10. The epicyclic motor is mechanically coupled to the lens holder 14 so that the driven rotational motion of an eccentrically mounted rotating armature 36 of the epicyclic motor (FIGS. 2, 3 and 4) rotates the lens holder 14 and the lens element 16 as a unit. The lens holder 14 is threaded on and thus is secured to a fixed support element (fixed with respect to the stator of the epicyclic motor 28) so that rotation of lens holder 14 moves it, with lens element 16, in a direction parallel to the lens axis, which coincides with the optical axis of the camera.

The illustrated camera also has an automatic range determining device 88, for example the sonic system described in Biber et al, U.S. Pat. No. 3,522,764, issued Aug. 4, 1970. The disclosure of U.S. Pat. No. 3,522,764, is incorporated herein by reference. The sonic rangefinding system disclosed in U.S. Pat. No. 3,522,764 provides an electrical signal which can operate drive circuits for motor 28 to focus the lens element 16.

The switch 100 shown in FIG. 1 is a lever or button the operator depresses, just prior to taking a picture, to turn on the automatic focusing mechanism and thereby automatically bring into focus the image viewed in the camera viewfinder.

Figure 4:
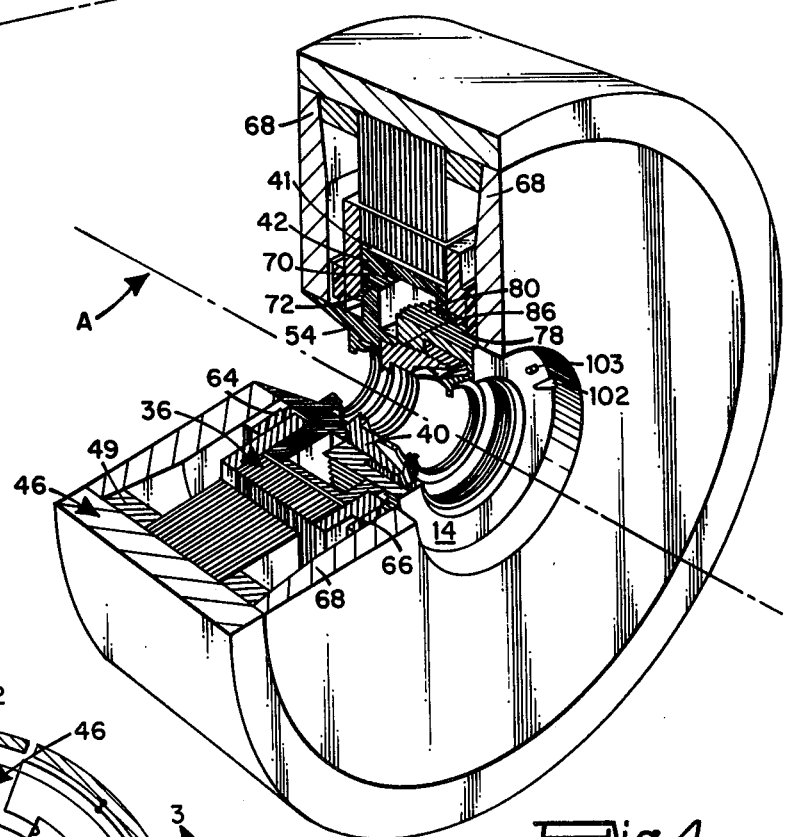
FIG. 4 is a 90° cut-away perspective view of the epicyclic focusing mechanism of the invention as seen along lines 4—4 of FIG. 2 and showing the epicyclic motor modified according to the invention.
Figure 2:
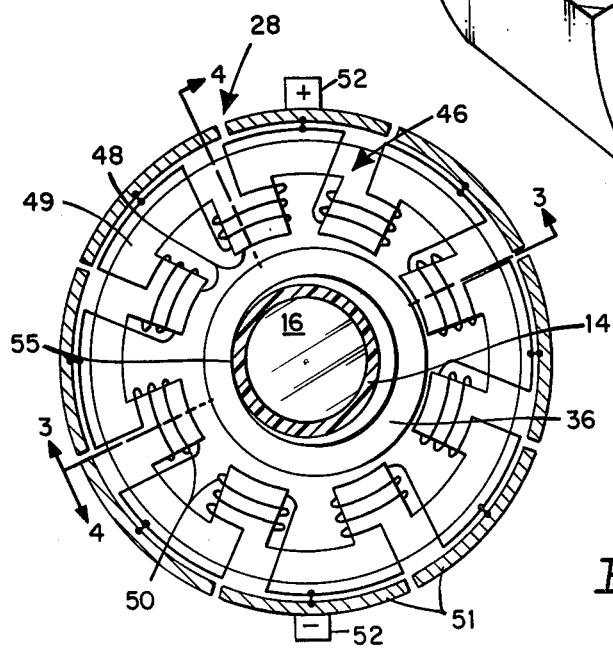
FIG. 2 is a schematic plan view of an epicyclic motor according to the invention which shows the position of the lens and lens holder relative to the rotating armature.
Figure 3:
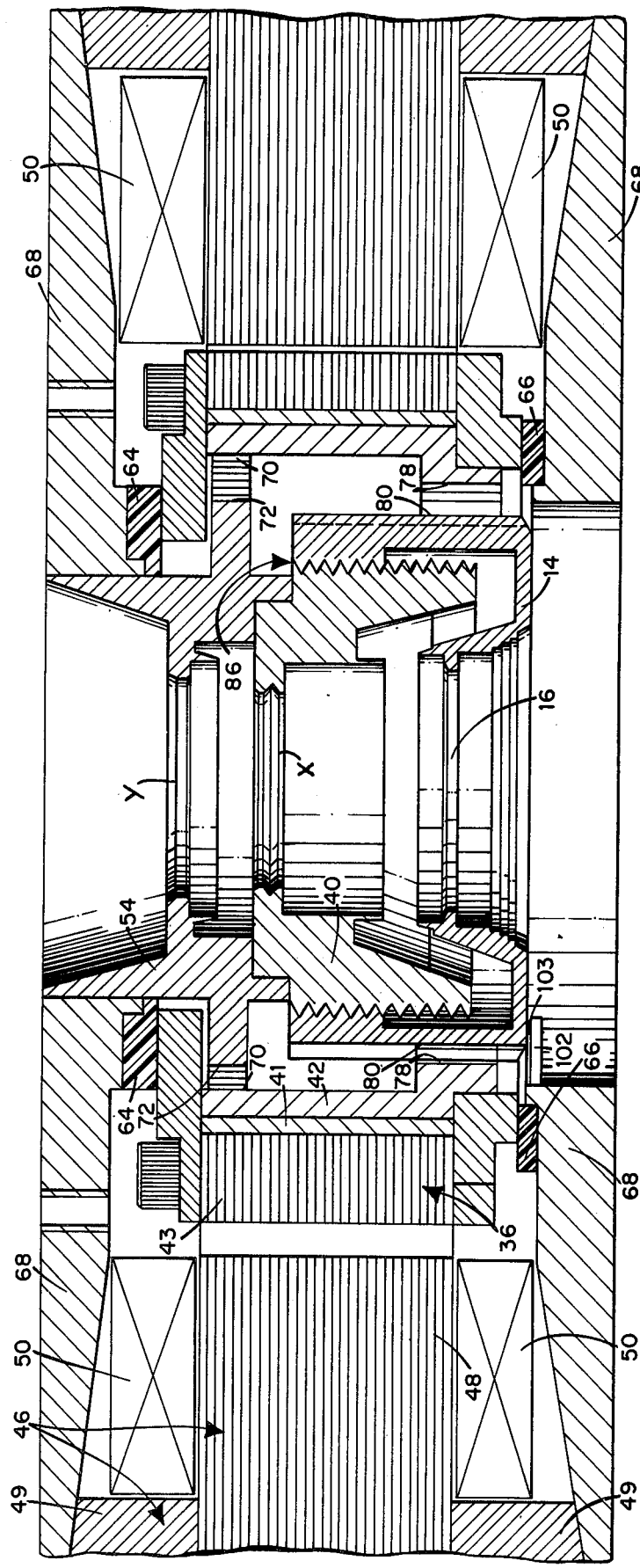
FIG. 3 is a cross section along lines 3—3 of FIG. 2, showing the relationship between the various fixed and movable lens mounts, the armature, and other elements of the epicyclic motor.

Referring now to FIGS. 2–4, the rotating armature 36 includes a magnetically soft iron sleeve member 41 carried on a central ring gear member 42. A stack of thin laminations 43 is carried on sleeve member 41. The armature thus assembled with sleeve member 41, gear member 42, and laminations 43 is disposed eccentrically within a stator 46 of the motor 28. The stator 46 has circumferentially-spaced and radially-extending pole pieces 48 of thin laminations and a yoke member 49. The stator may have any number of pole pieces 48, each with a coil 50 wound around it. The coils are illustrated in FIG. 2 connected electrically in series; the connection point between each pair of adjacent coils is brought out to a terminal diagrammatically illustrated in FIG. 2 as a commutator 51.

In the illustrated embodiment, the stator 46 has eight pole pieces 48 concentrically disposed about a fixed center axis A which coincides with the optical axis of the lens element 16. Electrical drive signals are applied to the coils so that a circumferentially-adjacent half of the coils effectively has a first magnetic polarity and the other circumferentially-adjacent half has the opposite magnetic polarity. With the connections shown in FIG. 2, where a rotatable pair of brushes 52 are illustrated in electrical contact with diametrically opposite commutators to provide power to the coils 50 of the epicyclic motor 28, the coils and corresponding pole pieces of the left half of the stator have one magnetic polarity while the coils and corresponding pieces of the right half of the stator have the opposite polarity. The resultant magnetic field pulls the eccentric armature against lens holder 14 and a fixed support element 54 at a circumferential site 55 (FIG. 2). As the brushes rotate, making contact with each successive pair of oppositely-positioned commutators, the respective coils are energized in such a manner that the magnetic field between the stator pole pieces rotates synchronously with the brushes. (The brushes and commutators, and the series connection of the coils, are shown only in FIG. 2 for illustrative purposes. Any of various configurations of electronic circuits preferably is provided in place of the brush-commutator structure, For example, solid-state components known in the art can provide the same rotating magnetic field.)

The armature 36 of the motor 28 moves, in response to the rotating magnetic field, around the fixed support element 54 with a rolling motion synchronized to the magnetic field. Since the inside surface of the armature which faces element 54 has a diameter greater than the supporting surface of element 54, the armature will also rotate about its own center as it rolls about element 54. In this manner, the center axis of the armature 36 rotates concentrically about the fixed axis A to provide an eccentric rotation to the armature. The epicyclic motor described thus far is known in the art, and is available, for example, from The Bendix Corporation. Further information concerning it is available in the art.

The epicyclic motor of FIG. 2 is adapted to a camera system, according to the invention, to focus an image at the camera film plane, as follows. Referring to FIGS. 3 and 4, the epicyclic focusing motor 28 includes the armature 36 assembled with elements 41 and 42 and 43, the stator 46 with pole pieces 48 and coil windings 50 and yoke 49, and the fixed support element 54. According to the invention, when adapted for focusing a camera lens, the motor further includes the lens holder 14, the movable focusing lens element 16, a lens holder support or wall element 40, and annular sliding support mounts 64 and 66. These mounts axially position the armature 36 within a support housing 68 of magnetically soft material that typically is secured to the body of camera 10.

In accordance with the invention, the optical light path from an image to the camera film plane 22 passes through the center of the motor, where the movable lens system is located. In this manner, the bulk of the motor is conveniently placed around the outside of the lens system and hence is compactly "absorbed" by the camera body. In this context fixed support elements 40 and 54 can also mount optical elements x and y respectively of the camera lens system.

As shown in FIGS. 3 and 4, the armature 36, along the cylindrical circumference where it contacts fixed support element 54, is provided with a first set of internal gear teeth 70 which mesh with corresponding external gear teeth 72 around a circumference of fixed support element 54. The outside diameter of that portion of the armature support 54 which is within the armature is sufficiently less than the armature inside diameter to provide annular spacing between these elements sufficient to accommodate the eccentric motion of the armature. Further, the armature gears mesh with the support gears only along part of the opposed toothed surfaces, due to the eccentric location of the armature about the support. Further, the pitches of the gear teeth 70 and 72, i.e. the number of gear teeth per inch, are approximately the same, i.e. they can be equal or differ slightly, so that as the armature 36 rolls about fixed element 54, it will rotate slowly about its own center.

The armature 36 has a second set of internal gear teeth 78 positioned around a second internal circumference and which mesh with a set of external gear teeth 80 formed around an outside circumference of lens holder 14 to provide means for coupling the armature 36 to the lens holder 14. The diameters of opposed surfaces of the armature and of the holder 14 differ to provide space between these surfaces as just described for the armature and the support element 54. Similarly, the pitches of gear teeth 78 and 80 are approximately the same, and the gears mesh only along a portion of the opposed surfaces. As noted above, the illustrated lens holder 14 is secured to the fixed lens-holder support element 40 by mating complementary helical threads 86 properly selecting the diameters of the mechanical components and the pitches of gear teeth 78 and 80 according to known practices, the armature 36 can apply large rotational torques as it rotates the lens holder 14. In this manner a substantial reduction in speed may be provided between the speed of the motor and the speed at which the lens is displaced. This rotational torque can rotate lens holder 14 in either direction and, through its helically arranged threaded connection to fixed support element 40, provides for reciprocal translation of the holder 14 along the optical axis. By appropriate choice of pitch diameters of threads 86 and of the gears, the increment of axial rotation of the lens holder 14 produced by an increment of armature rotation can be made substantially as small as required, e.g. in one instance less than 15 minutes of arc per increment.

Figure 5:
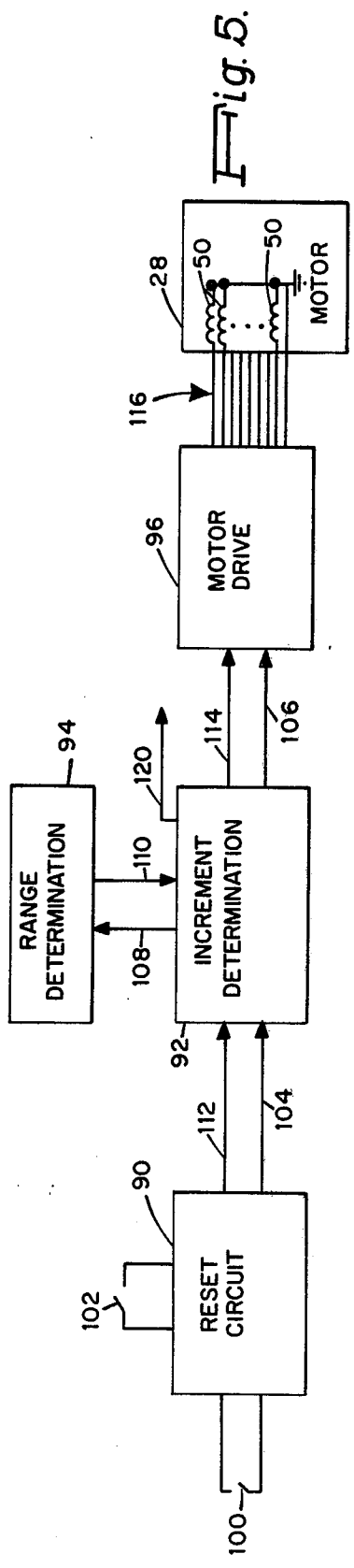
FIG. 5 is a block schematic diagram of electrical equipment for driving the incrementally driven rotating device according to the invention.

Referring now to FIG. 5, the illustrated electric system 88 (FIG. 1) for generating drive signals for operating the motor 28 through a plurality of arcuate increments includes a reset circuit 90, an increment determining circuit 92, a range determining circuit 94, and a motor drive circuit 96. (This illustrated electrical system is illustrative of at least several that can be used. The selection of a specific system and the construction of the circuits for it, including those illustrated, can employ conventional skills known in the art.) The reset circuit 90 is independently responsive to closures of switches 100 and 102 to operate circuits 92 and 96 to reset the lens element 16 to an initial predetermined focus position; for example, to either minimum or maximum focus. The operation of the reset circuit 90 is initiated by the closure of the contacts of switch 100, which as noted can be a manual lever-actuated switch located on the camera. Actuation of switch 100 by the operator closes the switch contacts and thereby actuates the reset circuit 90 to apply an "increment" signal level on line 104 to the increment determining circuit. This signal on line 104 serves two functions. First, it actuates the increment determining circuit to produce pulses, on a line 106, which actuate the motor drive circuit 96 to generate signals that reset motor 28 to an initial starting position. Each pulse on line 106 represents one increment of movement, and the pulses are spaced no closer than the minimum time required to increment the motor. Simultaneously, the increment determining circuit actuates the range determining circuitry 94, with signals on a line 108, to produce a signal, on a line 110, indicative of the range from the camera to the image. This latter signal can be provided as described in the above-noted U.S. Pat. No. 3,522,764 or by other apparatus known in the art. The signal on line 110 is processed as described below.

When the lens holder carries the focusing lens element 16 to the predetermined reset position, switch 102 closes to signal the reset circuit that the motor is at its initial reset position. The illustrated switch 102 is a microswitch fixed on the support housing 68 and actuated by a pawl 103 carried on the lens holder 14. The reset circuit thereupon provides a "reset complete" signal level over a line 112 to the increment determining circuit. (The "increment" signal level on line 104 is removed at or prior to the time the "reset complete" signal appears, depending on details of the circuit 92.) Upon receipt of the "reset complete" signal on line 112, the increment determining circuit terminates the stream of pulses on line 106 to the motor drive circuit, so that further reset-incrementing of the motor ceases.

Simultaneously, the increment determining circuit 92 converts the range determination signal on line 110, using for example a read-only memory or a non-linear analog to digital converter, to a binary number which represents the number of increments which the motor must turn to position the focusing lens element at the specified focus position. The increment determining circuit stores this number, e.g. in a register, and provides a number of pulses on line 114 to the motor drive circuit to rotate the motor armature, and hence the lens holder and lens element, to the correct position. After the number of pulses provided over line 114 equals the binary number stored in the increment determining circuit, the circuit 92 ceases transmitting pulses to the motor drive circuit, which in turn terminates incrementing motor 28 over a plurality of lines 116.

The illustrated motor drive circuit 96 simulates the brush 52 and commutator 51 arrangement shown schematically in FIG. 2 by using known solid state devices to arcuately increment the motor 28 more reliably and to reduce the motor size. In the illustrated embodiment, the coils 50 are arranged in a circuit for individual actuation, FIG. 5. Thus drive circuit 96 is connected over lines 116 to actuate each coil 50 independently, i.e. there is a separate line 116 to each coil, and there also is a common (e.g. ground) return.

When the motor 28 has reached its correct "in focus" position, the illustrated increment determining circuit provides a signal level over a line 120 which can, for example, signal the user, with an indication in the viewfinder of the camera, that the camera is in focus. At this juncture, a picture is taken. Where desired, an interlock can be provided between the focusing and the picture-taking operations so that a picture is not taken until the camera has reached the focus condition.

As noted above, the range determining circuit 94 can be constructed in the manner disclosed in U.S. Pat. No. 3,522,764, or it can be provided by other known automatic manual control systems. Thus, for example, a manually controlled rangefinder could be used to determine the distance from the camera to the image, and upon closing of switch 100, the increment determining circuit can use that manual setting to effect movement of lens element 16.

In other embodiments, the position of the lens focusing element 16 can be stored in the increment determining circuit by using an up-down digital counter to count the pulses provided over lines 106, 114. In that case, the reset at the beginning of each focus determination can be eliminated. The system instead is reset and after electric power is removed, to provide the up-down counter with a known initial starting position.

EXAMPLE

In a particular embodiment of the invention as illustrated, the epicyclic motor has eight stator pole pieces 48 and eight stator coil windings 50. The armature is provided with one hundred and twelve gear teeth 70 at a pitch diameter of 1.1667 inches, and the fixed support element 54 is provided with one hundred and eight gear teeth 72 at a pitch diameter of 1.125 inches. The portion of the armature which meshes with the lens holder is provided with one hundred and four gear teeth 78 at a pitch diameter of 1.0833 inches, and the lens holder itself is provided with one hundred gear teeth 80 at a pitch diameter of 1.0417 inches. This construction produces rotational movement of the lens, in an opposite direction from rotational movement of the armature, of 0.989 degrees per complete cycle of the armature (eight incremental steps), so that after three hundred and sixty-four cycles (2912 increments) the lens element rotates a full 360 degrees; this is the maximum rotation to transport the focusing element over the full focus range. Where the threads 86 have an 0.25 inch lead so that one complete rotation of the lens element 16 advances it by 0.250 inch, then each increment of motor rotation corresponds to an axial movement of the lens element of about 0.00008 inch.

Other embodiments of the invention including additions, subtractions, deletions, and other modifications will be obvious to those within the skill of the art and are within the ambit of the following claims.

Although the focusing apparatus of this invention is described in relation to a camera structure, it will be understood that the invention has broader application and may be used in conjunction with other devices such as a microscope.

Having described the invention, what is claimed as new and secured by Letters Patent is:

1. In apparatus for focusing a lens, the improvement comprising:
    an epicyclic motor including an armature having a central axis which is rotated concentrically about a fixed axis extending parallel thereto responsive to energization of said motor and a plurality of pole pieces adapted to be energized in a sequential pulse-type manner to impart an eccentric rotation to said armature;
    a lens holder support;
    means for fixedly mounting said lens holder support concentrically about said fixed axis;
    a lens holder adapted to fixedly mount a lens with the optical axis of the lens extending substantially centrally through said lens holder, said lens holder and said lens holder support including complementary means for mounting said lens holder on said lens holder support with the optical axis of the lens being the same axis as said fixed axis and for relative axial movement of said lens holder along said lens holder support responsive to rotational movement being imparted to said lens holder; and
    means for coupling said lens holder to said motor armature whereby said motor armature imparts a rotary motion to said lens holder responsive to energization of said motor, said apparatus thus providing in a substantially compact structure a substantial reduction between the speed of said motor thereto, and the speed at which the lens is displaced responsive thereto, and the pulses provided to said motor pole pieces are indicative of the position of the lens along said given axis, wherein said plurality of pole pieces of said epicyclic motor are arranged to define a stationary stator, and said armature of said epicyclic motor is disposed for eccentric rotation about said fixed axis within said motor stator and said fixed support element of said epicyclic motor further acts as a positionally fixed armature support centrally mounted within said stator for rotationally engaging said armature upon driven eccentric rotation thereof; and wherein said coupling means engages said armature and said lens holder for rotating said lens holder about said fixed axis as said armature is caused to roll around said armature support in response to the pulses provided to said motor pole pieces, the central axis of said armature describing a circle as it rotates about said fixed axis with said lens holder moving along the optical axis of the lens as it rotates.

2. The apparatus of claim 1 wherein said epicyclic motor may be reset to an initial starting condition corresponding to a select position of the lens element along its optical axis.

3. The apparatus of claim 1 wherein said complementary means includes means for threadably engaging said lens holder support to said lens holder in order to move said lens holder along said fixed axis upon rotation thereof by said motor armature.

4. The apparatus of claim 1 further comprising at least another lens element in optical alignment with the movable lens element and in which said lens holder support mounts said other lens element in a fixed position.

5. The apparatus of claim 1 further comprising means for generating the pulses provided to said motor pole pieces and including means for determining the direction and the amount of rotation of said motor armature to provide a select focus condition of the lens element along its optical axis; and
    means for providing the pulses to said motor in response to said direction determining means.

6. The apparatus of claim 5 wherein said determining means comprises:
    means for providing a pulse output signal representative of the number of arcuate increments required to rotate said motor armature to achieve said select focus condition.

7. The apparatus of claim 1 further comprising means for generating the pulses provided to said motor pole pieces and including;
    means for resetting said motor armature to an initial starting condition corresponding to a select position along the optical axis of the lens element; and a focus determining circuit for providing the electrical output pulse signal representative of the number of arcuate increments required to rotate said motor armature from said initial starting condition to a position corresponding to a select focused condition of the lens element along its optical axis.

8. Apparatus for imparting and controlling reciprocal translation movement of at least one lens element along its optical axis, said apparatus comprising:

a fixed support element;

means for driving the lens element, said driving means including a lens holder support element connected in fixed relation with respect to said support element, and a movable lens holder adapted to fixedly mount the lens, said lens holder support element and lens holder including complementary means for mounting said lens holder with respect to said lens holder support element for accomodating translational movement of said lens holder along the center axis of said lens holder support element responsive to rotational movement being imparted to said lens holder;

an epicyclic motor having an armature eccentrically disposed and a stator element concentrically disposed both with respect to said lens driving means with said stator element fixedly connected with respect to said fixed support element;

means for drivably coupling said lens holder of said lens driving means to said armature of said epicyclic motor in a manner operating to substantially reduce the number of turns at which said lens driving means is driven in comparison to the number of turns actually made by said armature; and means for providing a drive signal to said epicyclic motor and for controlling said drive signal in a digital manner so that the exact position of said lens element at any location along its path of reciprocal translation can be determined without benefit of a feedback signal wherein said armature is disposed for eccentric rotation inside said motor stator and said fixed support element additionally acts as a positionally fixed armature support centrally mounted coaxially within said motor stator for rotationally engaging said armature upon driven eccentric rotation thereof; and wherein said coupling means engages said armature and said lens holder of said lens driving means for rotating said lens holder about the center axis of said motor stator as the armature is caused to roll around said armature support in response to said drive signal, the center of said armature describing a circle as it rotates and said lens holder moving along the path of reciprocal translation as it rotates.

9. The apparatus of claim 8 wherein said drive signal means can provide a reset signal to said epicyclic motor to reset said apparatus to an initial starting condition corresponding to a select position of the lens element along its path of reciprocal translation.

10. The apparatus of claim 8 wherein said complementary means includes means for threadably engaging said lens holder to said lens holder support element in order to move said lens holder along the path of reciprocal translation upon rotation thereof by said motor armature.

11. The apparatus of claim 8 further comprising at least another lens element in optical alignment with the movable lens element and in which said lens holder support element mounts said other lens element in a fixed position.

12. The apparatus of claim 8 wherein said means for providing said drive signal includes;

means for determining the direction and amount of rotation of said motor armature to provide a select focus condition of the lens element along its path of reciprocal translation; and means for providing said drive signal to said motor in response to said direction determining means.

13. The apparatus of claim 12 wherein said determining means comprises;

means for providing to said drive signal providing means a pulse output signal representative of the number of arcuate increments required to rotate said motor armature to achieve said select focus condition.

14. The apparatus of claim 8 wherein said means for providing said drive signal includes;

means for resetting said motor armature to an initial starting condition corresponding to a select position of the lens element along its path of reciprocal translation; and a focus determining circuit for providing an electrical output signal representative of the number of arcuate increments required to rotate said motor armature from said initial starting condition to a position corresponding to a select focused condition of the lens element along its path of reciprocal translation.

* * * * *